United States Patent Office 3,635,978
Patented Jan. 18, 1972

3,635,978
AMINO PYRIMIDINES
Hamish C. S. Wood, Glasgow, Scotland, and Alexander Stuart, Kent, England, assignors to The University of Strathclyde, Glasgow, Scotland
No Drawing. Filed Jan. 28, 1969, Ser. No. 794,786
Int. Cl. C07d 51/42
U.S. Cl. 260—256.4 C
2 Claims

ABSTRACT OF THE DISCLOSURE

A compound 2-amino-4-hydroxy-6-hydroxymethyl-7,7-dimethyl-7,8-dihydropteridine, or tautomeric forms thereof and pharmaceutically acceptable salts thereof. The compound is useful as a bacteriostat and in antibacterial products. The compound has useful activity against *Cl. perfringens* and *Derm. dermatonomous*.

DESCRIPTION OF THE INVENTION

The present invention relates to a derivative of pteridine.

It has been found that the compound 2-amino-4-hydroxy-6-hydroxymethyl-7,7-dimethyl - 7,8 - dihydropteridine (Formula I on pages 6 to 8 hereof), or tautomeric forms thereof, and pharmaceutically acceptable salts thereof are useful as bacteriostats. The above mentioned compound, or tautomeric forms thereof, and pharmaceutically acceptable salts thereof are of particular value in anti-bacterial products effective against the following organisms: *Cl. perfringens* and *Derm. dermatonomous*.

The invention described herein was made in the course of work under a grant or award from the Department of Health, Education and Welfare.

The compound 2-amino-4-hydroxy-6-hydroxymethyl-7,7-dimethyl-7,8-dihydropteridine, or tautomeric forms thereof, and salts thereof are useful in solution to sterilize medical instruments.

The compound I may be prepared by the synthetic route shown in the flow chart on pages 6 to 8 hereof.

It is assumed that the intermediate compound X is formed; the conversion of compound IX to compound I is carried out in practice by the reductive cyclization of the former by reducing agents capable of reducing the nitro group without attacking other parts of the molecule, for example, by means of sodium dithionite or catalytic hydrogenation using catalysts such as palladium charcoal, platinum or Raney nickel.

The reagents and reaction conditions preferably used in the steps outlined in the flow chart will appear from the following example and may be modified in any manner as will be apparent to those skilled in the art.

According to the present invention, therefore, there are provided:

(i) The compound 2 - amino-4-hydroxy-6-hydroxymethyl-7,7-dimethyl-7,8-dihydropteridine (I), tautomeric forms and salts thereof;

(ii) The method of preparing (I) which comprises the reductive cyclization of 2-amino-4-(1',1'-dimethyl-3'-hydroxy-acetonyl)amino-6-hydroxy - 5 - nitropyrimidine (IX), for example, with sodium dithionite;

(iii) The compound (I) when prepared by the method (ii); and (iv) As novel compounds of value as chemical intermediates:

(a) 1-diazo-3-methyl-3-phthalimidobutan-2-one (IV);
(b) 1-hydroxy-3-methyl-3-phthalimidobutan-2-one (V);
(c) 3-amino-1-hydroxy-3-methylbutan-2-one (VI) and salts thereof;
(d) 3-amino-1-hydroxy-3-methylbutan-2-one semicarbazone (VII) and salts thereof;
(e) 2-amino-4-(1',1'-dimethyl - 3' - hydroxyacetonyl) amino-6-hydroxy - 5 - nitropyrimidine semicarbazone (VIII); and
(f) 2-amino-4-(1',1'-dimethyl - 3' - hydroxyacetonyl) amino-6-hydroxy-5-nitropyrimidine (IX).

If a salt of the compound I is used the salt should be a salt of a pharmaceutically acceptable acid or alkali, such as hydrochloric acid, sulphuric acid, tartaric acid, maleic acid, ammonia, sodium hydroxide and tetramethylammonium hydroxide. The compound I may be used as a bacteriostat in a concentration of 90 to 160 mg./ml. of the solution in which the organism is capable of growing without the compound.

The invention, in another aspect, provides pharmaceutical formulations comprising the compound (I), or tautomeric forms thereof, or pharmaceutically acceptable salts thereof, in association with a pharmaceutically acceptable carrier. The substance may advantageously be presented in discrete units, such as tablets, capsules, cachets or ampoules, each containing a predetermined amount of the compound. It may also be presented as a powder or granules, as a solution or suspension in an aqueous, non-aqueous or emulsified liquid, or as an ointment. For parenteral use, the formulations must be sterile and are presented in sealed containers. The formulations of this invention may be made by any of the methods of pharmacy, and may include one or more of the following accessory ingredients; diluents, solutes, buffers, flavouring, binding, dispersing, surface-active, thickening, lubricating, and coating materials, preservatives, antioxidants, and ointment bases, and any other acceptable excipients.

The following example illustrates the invention. Temperatures are in degrees Celsius.

EXAMPLE

N-phthalyl-2-aminoisobutyric acid (II).—A mixture of phthalic anhydride (80 g.) and 2-aminoisobutyric acid (40 g.) was fused at 180–185°. The temperature was maintained at 180° for 20 minutes and the melt allowed to cool overnight. It was dissolved in 10% sodium bicarbonate (~1 litre), filtered and acidified with concentrated hydrochloric acid. The mixture was cooled and the white crystalline solid was filtered, washed with water and dried (60° C.), M.P. 153–154°.

N-phthalyl-2-aminoisobutyric acid chloride (III).—N-phthalyl-2-aminoisobutyric acid (75 g.) was treated with thionyl chloride (200 ml.) under reflux for 1 hour. Thionyl chloride was evaporated in vacuo, followed by three evaporations with ether to remove residual traces. The residue was recrystallised from petroleum ether (60–80°) to give a colourless crystalline solid, M.P. 79°.

1-diazo-3-methyl-3-phthalimidobutan-2-one (IV).—An alcohol-free ethereal solution of diazomethane was prepared by adding "Diazald" (136 g.) dissolved in ether (950 ml.) dropwise to a flask containing a solution of potassium hydroxide (40.9 g.) in water (70 ml.), ethyl digol (240 ml.), and ether (70 ml.), heated on a water bath at 65–70°. The diazomethane formed in situ was distilled and collected. To this a solution of N-phthalyl-2-aminoisobutyric acid chloride (51.1 g.) in ether (700 ml.) was added slowly with shaking. The mixture was left overnight at room temperature. The ether was evaporated in vacuo to give a pale yellow crystalline solid. This material was pure enough to be used in the next reaction.

1-hydroxy-3-methyl-3-phthalimidobutan-2-one (V).—The diazoketone (50 g.) prepared above was suspended in 0.5N-sulphuric acid (500 ml.) and warmed to 80° to initiate hydrolysis. After all effervescence had ceased, the mixture was poured into ice-water (1 litre) to produce the hydroxymethyl ketone as a crude solid. This was filtered, washed with a little water (50 ml.) and recrystallized from aqueous ethanol (charcoal) to give a pale yellow crystalline solid, M.P. 118°.

3-amino-1-hydroxy-3-methylbutan-2-one hydrochloride (VI).—The above phthalimido-ketone (30 g.) was treated with 6N-hydrochloric acid (400 ml.) under reflux for 2½ hours. The solution was cooled and phthalic acid (19 g.) which crystallised out was removed by filtration. The filtrate was evaporated to dryness in vacuo, and ethanol (50 ml.) ws added, followed by ether (250 ml. to precipitate the aminoketone as hydrochloride. The product was converted into the semicarbazone, M.P. 208°, as follows:

Semicarbazide hydrochloride (1 equiv.) was dissolved in the minimum of water and sodium bicarbonate (1 equiv.) added with stirring until all effervescence had ceased. The aminoketone hydrochloride (1 equiv.) was added portionwise with stirring and the mixture heated on the steam-bath for 30 minutes. The aminoketone hydrochloride semicarbazone (VII) separated as a colourless crystalline mass on cooling, and was filtered, then washed with alcohol and ether, M.P. 208°. The compound prepared in this way was pure enough for the subsequent reaction.

2-amino-4-(1′,1′-dimethyl - 3′-hydroxyacetonyl)amino-6-hydroxy-5-nitropyrimidine (IX).—The aminoketone hydrochloride semicarbazone (VII) (6.8 g.), 2-amino-4-chloro-6-hydroxy-5-nitropyrimidine (6.0 g.), and triethylamine (10 ml.) were refluxed in ethanol (450 ml.) for 16–20 hours. The reaction mixture was cooled and evaporated to 200 ml. to precipitate the pyrimidinylaminoketone semicarbazone (VIII) as a beige solid (6.0 g.), M.P. 206–210°. The semicarbazone group was removed by treatment with 2N-hydrochloric acid (100 ml.) under reflux for 10 minutes. The solution was cooled, filtered and neutralised with 0.880 ammonia, added dropwise with stirring, to precipitate the pyrimidinylaminoketone as a yellow-white solid, which was washed with water, ethanol and ether.

2 - amino-4-hydroxy-6-hydroxymethyl-7,7-dimethyl-7,8-dihydropteridine (I).—The pyrimidinylaminoketone (4.0 g.) was suspended in water (50 ml.), heated on the steam-bath and treated with solid sodium dithionite until the original solid had dissolved. After 5–10 minutes the dihydropteridine product began to separate out. Heating was continued for a further 10 minutes and the mixture was then cooled to complete the separation of the product, which was filtered and washed with water, ethanol and ether. It was purified by dissolution in 2N-hydrochloric acid, filtration, and dropwise addition of 0.880 ammonia to pH 8.0 to precipitate the product. Investigations by IR, UV and NMR, and the mobilities on paper chromatography, all indicated the product had the structure of Formula I. The analytical results for the empirical formula $C_9H_{13}N_5O_2$ were: Theory (percent): C, 48.42; H, 5.87; N, 31.38. Found (percent): C, 48.20; H, 6.27; N, 32.07.

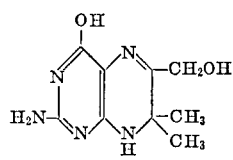

(I)

Synthetic route

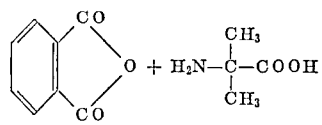

↓

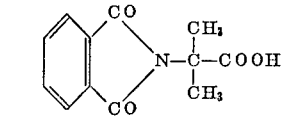

(II)

↓

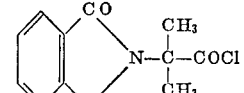

(III)

↓

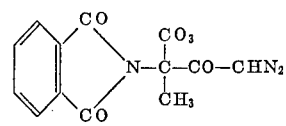

(IV)

↓

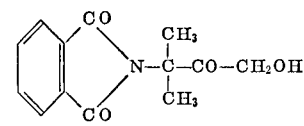

(V)

↓

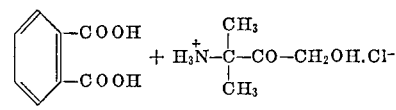

(VI)

↓ $H_2N.NH.CO.NH_2$

(VII)

↓

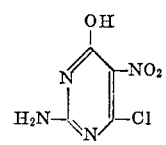

↓

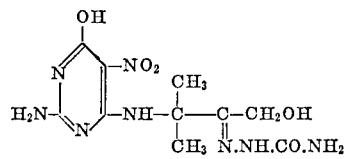

(VIII)

↓

(IX)

↓

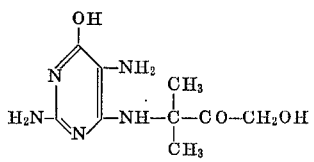
(I)
We claim:
1. 2-amino-4-(1',1' - dimethyl - 3' - hydroxyacetonyl) amino-6-hydroxy-5-nitropyrimidine semicarbazone.
2. 2-amino-4-(1',1' - dimethyl - 3' - hydroxyacetonyl) amino-6-hydroxy-5-nitropyrimidine.
References Cited
UNITED STATES PATENTS
2,723,977   11/1955   Rorig _____ 260—256.4 C
ALEX MAZEL, Primary Examiner
R. J. GALLAGHER, Assistant Examiner
U.S. Cl. X.R.
260—239 A, 251.5, 326 A, 554, 504 A; 424—251